United States Patent
Rose

[11] Patent Number: 5,941,556
[45] Date of Patent: Aug. 24, 1999

[54] SIMPLIFIED PASSENGER AIRBAG MODULE USING THE INFLATOR AS A STRUCTURAL MEMBER

[75] Inventor: Larry D. Rose, Layton, Utah

[73] Assignee: Autoliv ASP, Inc., Ogden, Utah

[21] Appl. No.: 08/844,347

[22] Filed: Apr. 18, 1997

Related U.S. Application Data

[63] Continuation-in-part of application No. 08/715,278, Sep. 16, 1996, Pat. No. 5,788,266.
[51] Int. Cl.$^6$ .................................................. B60R 21/16
[52] U.S. Cl. ......................................... 280/728.2; 280/732
[58] Field of Search .................................. 280/728.2, 732

[56] References Cited

U.S. PATENT DOCUMENTS

| | | | |
|---|---|---|---|
| 4,944,527 | 7/1990 | Bishop et al. ............................ | 280/741 |
| 4,964,654 | 10/1990 | Bishop et al. ............................ | 280/743 |
| 5,149,130 | 9/1992 | Wooley et al. ........................... | 280/743 |
| 5,340,147 | 8/1994 | Fontecchio et al. .................. | 280/728.2 |
| 5,398,958 | 3/1995 | Taggart .................................. | 280/728.2 |
| 5,533,750 | 7/1996 | Karlow et al. ......................... | 280/728.2 |
| 5,542,691 | 8/1996 | Marjanski et al. .................... | 280/728.2 |

*Primary Examiner*—Kenneth R. Rice
*Attorney, Agent, or Firm*—Sally J. Brown

[57] ABSTRACT

A simplified, low cost, passenger airbag module that is particularly suited for stamped steel construction and is easy to assemble, uses the inflator as a structural member, specifically, as an axial tension member, requires only one fastener member, and reduces the number of module parts to six (6) (excluding a decorative cover).

13 Claims, 6 Drawing Sheets

Typical Extruded
Aluminum Hsg.
5 Fasteners

Typical Steel Hsg.
17 Fasteners

STEP I

SLIDE RETAINER INTO CUSHION AND INSERT TAB THRU BUTTON HOLE

STEP 2

INSERT RETAINER TUBE/CUSHION ASSEMBLY INTO MODULE HOUSING AND SECURE WITH FASTENER

FIG. 9
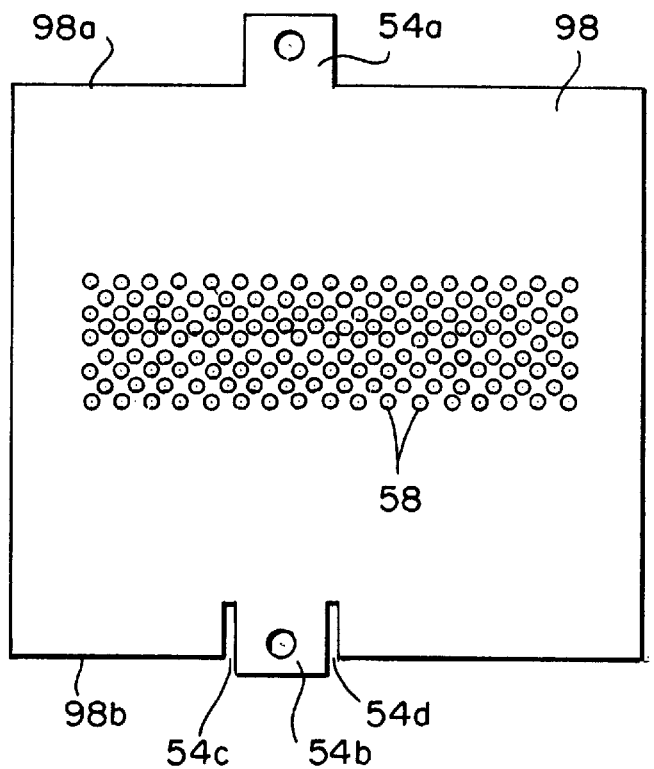
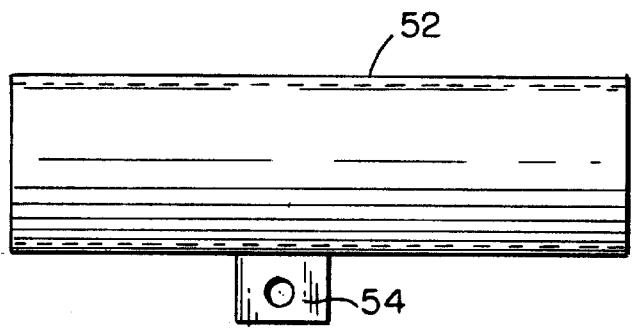
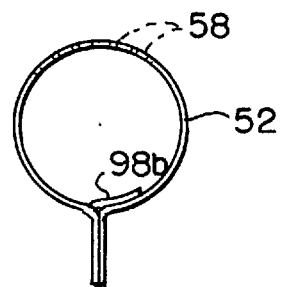
FIG. 10
FIG. 11

FIG. 12
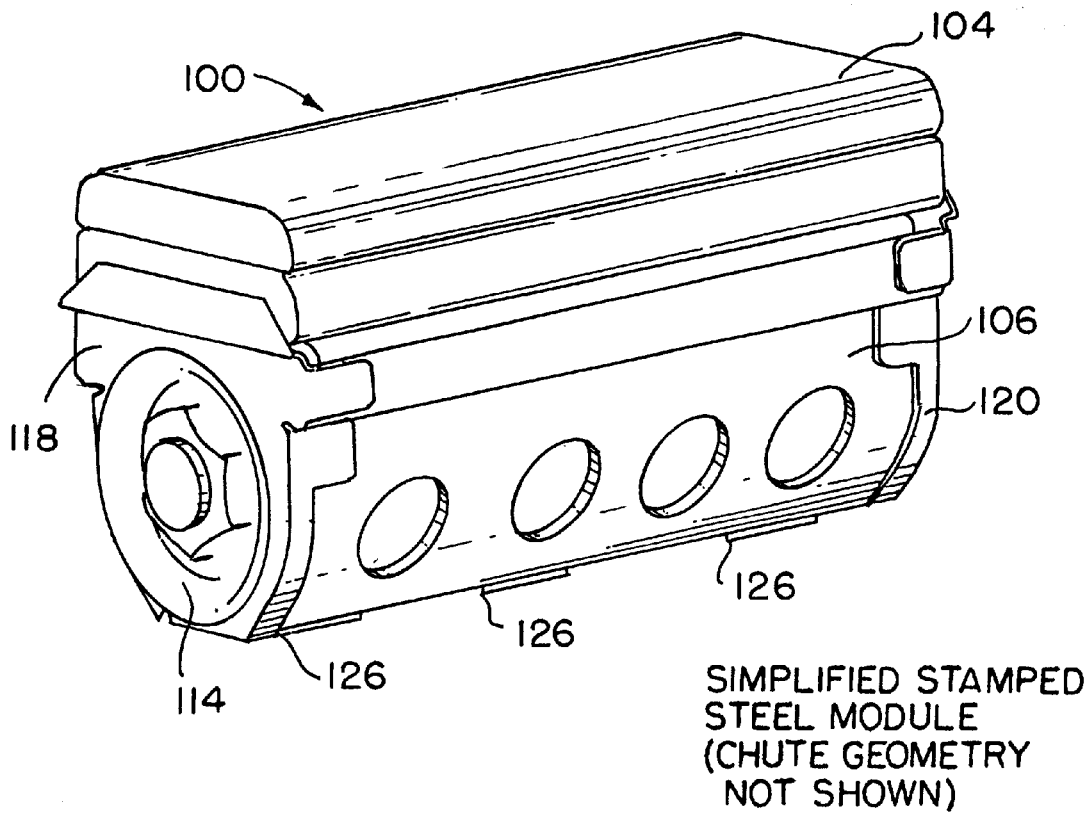
SIMPLIFIED STAMPED STEEL MODULE (CHUTE GEOMETRY NOT SHOWN)
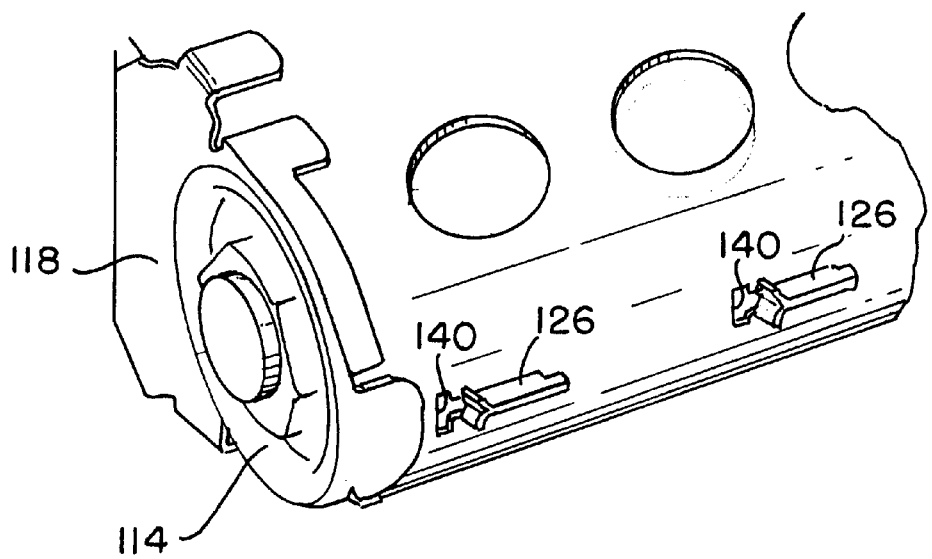
FIG. 13

5,941,556

SIMPLIFIED PASSENGER AIRBAG MODULE USING THE INFLATOR AS A STRUCTURAL MEMBER

CROSS REFERENCE TO RELATED APPLICATION

This application is a continuation-in-part of a previous application filed in the United States Patent and Trademark Office by Larry D. Rose and Donald J. Paxton on Sep. 16, 1996, entitled "SIMPLIFIED AIR BAG MODULE HOUSING," and assigned Ser. No. 08/715,278, now U.S. Pat. No. 5,788,266.

The disclosure of the co-pending patent application bearing Ser. No. 08/715,278 is hereby incorporated by reference herein, and is made a part hereof, including but not limited to those portions which specifically appear hereinafter.

BACKGROUND OF THE INVENTION

1. Field of the Invention

This invention is a simplified airbag module housing which is useful in motor vehicle inflatable restraint systems and is particularly suited for stamped steel construction. The invention is a low cost, unique airbag module that requires only one fastener to complete the assembly, and reduces the total number of module parts to six (6), excluding a decorative cover.

2. Description of the Related Art

Motor vehicle inflatable restraint systems typically include a crash sensor suitably mounted on the vehicle frame and an airbag system or assembly positioned within the vehicle passenger compartment. The airbag assembly generally includes an inflatable cushion and a gas generator, which, respectively, are commonly called an airbag and an inflator. The inflator is a type responsive to a control signal produced by the crash sensor and provides gas to inflate and deploy the airbag upon a sudden vehicular deceleration, sensed by the crash sensor, that is indicative of the onset of a crash.

Also included in the airbag assembly is an outer reaction canister or module housing in which the airbag and inflator are contained. The module housing is a structurally sound member which supports the weight of the folded airbag and the inflator and absorbs and retransmits the airbag deployment forces to the vehicle.

The airbag typically has a section that defines a gas inlet opening for receiving the generated inflating gas upon activation of the inflator. High loads, that is, great amounts of force, are inserted on the airbag and the module housing particularly during the initial stage of inflator activation inflation snap of the airbag. Because of this, secure coupling of the airbag to the module housing is important.

It is generally desirable to reduce the number of fasteners in an airbag system or assembly. Typically, a passenger airbag module, such as the prior art extruded aluminum module housing shown in FIG. 1, is assembled using a plurality of fasteners. The assembly 10 of FIG. 1 includes a reaction canister 12, an inflator 14, a reaction canister body part 16, end caps 18a and 18b, a folded airbag 20, a diffuser plate 22, and a nut 24. A circular opening 26 is provided in end cap 18a and a smaller keyed opening 28 is provided in the end cap 18b. A flange 30 is provided on one end of the inflator 14 and a threaded key stud 32 is provided on the other end thereof. The size of the opening 28 of the end cap 18b is such as to allow the inflator stud 32 to be inserted therein with the inflator flange 30 mating with the opening 26 in the end cap 18a. The diffuser plate 22 supports the folded airbag 20. The open mouth of the airbag 20 is restrained by dowels 34. The nut 24, which is screwed on the stud 32 of the inflator 14, and four fasteners, which attach the end caps 18a and 18b to the reaction canister 12, hold the assembly together. Thus, in FIG. 1 a total of five (5) fasteners are employed to hold the assembly together.

There are many situations where it is desirable to surround the inflator, which is positioned within the module housing, with a retainer tube to help control gas flow to the airbag, contain the pressure, and protect the airbag. The aluminum extruded housing airbag module construction shown in FIG. 1 addresses these problems by utilizing airbag retainer channels and hollow sections. There are many situations, however, where it may be desirable or cost effective to use a stamped steel module housing, such as the prior art typical steel housing assembly shown in FIG. 2.

The assembly of FIG. 2 includes a stamped steel reaction canister 36, an inflator 38, an airbag 40, and an airbag retaining ring 42. Seventeen (17) fasteners are utilized in the assembly of FIG. 2. Most of the fasteners are required for the attachment of the airbag 40 to the reaction canister 42.

Competition in the airbag industry is driving down the price of airbag modules. To be competitive manufacturers must find ways, while maintaining reliability, to produce low cost airbag modules. Three of the best ways to reduce cost are: 1. minimize the number of parts and fasteners; 2. design for easy assembly; and 3. use low cost construction materials. Stamped steel, which, typically, is the lowest cost material for fabrication of structural airbag module components, has been used for airbag module construction, as mentioned above. Stamped steel designs, however, typically, have been labor intensive, requiring multiple fasteners, as shown in FIG. 2. Extruded aluminum designs, as shown in FIG. 1, typically are simpler and easier to assemble but still require multiple fasteners. The extruded aluminum designs also become expensive when multiple secondary operations are required on the extrusion.

There exists a need and a demand for improvement in the construction and assemblage of airbag module housings to reduce the technological gap that exists in respect of the number of parts and fasteners that are required in the assembly of extruded aluminum and stamped steel airbag module housings.

SUMMARY OF THE INVENTION

It is an object of the invention to provide a simplified airbag module housing arrangement.

Another object of the invention is to provide a reliable airbag module in which the number of parts and fasteners are minimized, that is easy to assemble, and which uses low cost construction materials.

A further object of the invention is to provide a stamped steel airbag module housing arrangement that is simple, inexpensive, reliable and easy to assemble.

The invention, in an exemplary embodiment, consists of three unique features: a retainer tube with an anchor tab, a module housing with an attachment flange, and an airbag constructed with a button hole for the anchor tab. Only two fasteners are required to complete the module assembly.

The retainer tube is circular or elliptical in shape and is formed from a single flat pattern of planar metal sheet. The retainer tube retains the airbag while under inflation and bears the high loads that are generated during the initial stage of inflator actuation. The retainer tube houses the inflator and functions as a generated gas management tool by containing the initial gas discharge pressure and/or redirecting the flow of the gas. The retainer tube further acts as a barrier, protecting the airbag from he hot generated gas.

A key feature of this embodiment of the invention is the anchor tab which protrudes from the retainer tube and is used to join the retainer tube to the module housing. The anchor tab also prevents the airbag from rotating under load on the retainer tube. The anchor tab typically is offset to one side to control the airbag to module housing orientation.

The module housing attachment flange, a unique feature of the invention, consists of two legs each of which extend from a respectively associated sidewall of the housing. The legs are specially formed to receive the anchor tab and are typically spot welded together to maintain the rigidity of the module housing.

The attachment flange is a stiff member that will carry the airbag loading forces that are transmitted through the anchor tab. The attachment flange can be located in any radial position within a 180 degree arc corresponding to the back half of the module housing.

The attachment flange, as described, can be omitted under special circumstances. In such a case, the anchor tab would be attached parallel to the sidewall of the module housing.

In accordance with the invention, the airbag is constructed to receive the retainer tube. The construction of the airbag, in this respect, can be simplified to one main loop with a button hole and two side panels. Since the airbag loops around the retainer tube, loading is distributed and fabric stresses at initial deployment of the airbag are minimized. If an internal tether is required, additional tabs could be added to the anchor tab side of the retainer tube to help resist airbag rotation of the tube.

The invention, in another exemplary embodiment of the invention, consists of a simplified stamped steel airbag module construction that requires only one fastener to complete the assembly. Current production stamped steel modules, as indicated in FIG. 2, have 10 to 20 parts which include multiple fasteners. This invention, which is specifically intended to be used with a stamped steel module construction, requires an inflator that can be used as a structural member, specifically an axial tension member.

This invention, in particular, features a diffuser/retainer tube having multiple T-tabs which interlock with the module housing. The T-tabs, which are formed as part of the diffuser/retainer tube (see FIGS. 13 and 14), are unique in that they:

1. Prevent bag snap induced axial rotation of the diffuser/retainer tube by interlocking with the module housing (prior art uses fasteners to solve this problem).

2. Simplify and foolproof the cushion attachment process. The diffuser/retainer tube is simply inserted into the cushion and the T-tabs are snapped through small holes in the loop of the cushion. Because of the T-tab geometry, the cushion remains attached to the diffuser/retainer tube during installation into the module housing. Cushion to diffuser orientation is controlled by offsetting one of the T-Tabs.

3. Allow simple cushion construction methods.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this description of the invention, a detailed description follows with reference being made to the accompanying figures of drawing which form part of the specification and of which:

FIG. 9 is a detail drawing illustrating a planar view of a retainer tube according to the invention;

FIG. 10 illustrates a front plan view of the formed retainer tube;

FIG. 11 is a plan end view of the retainer tube shown in FIG. 10;

FIG. 12 is a perspective view of an assembled simplified stamped steel air bag module that is in general accordance with an alternative embodiment of the invention;

FIG. 13 is a fragmented perspective view illustrating the function of multiple T-tabs which interlock the diffuser/retainer tube with the module housing in the invention embodiment shown in FIG. 12.

DESCRIPTION OF THE PREFERRED EMBODIMENTS

Figure 1:
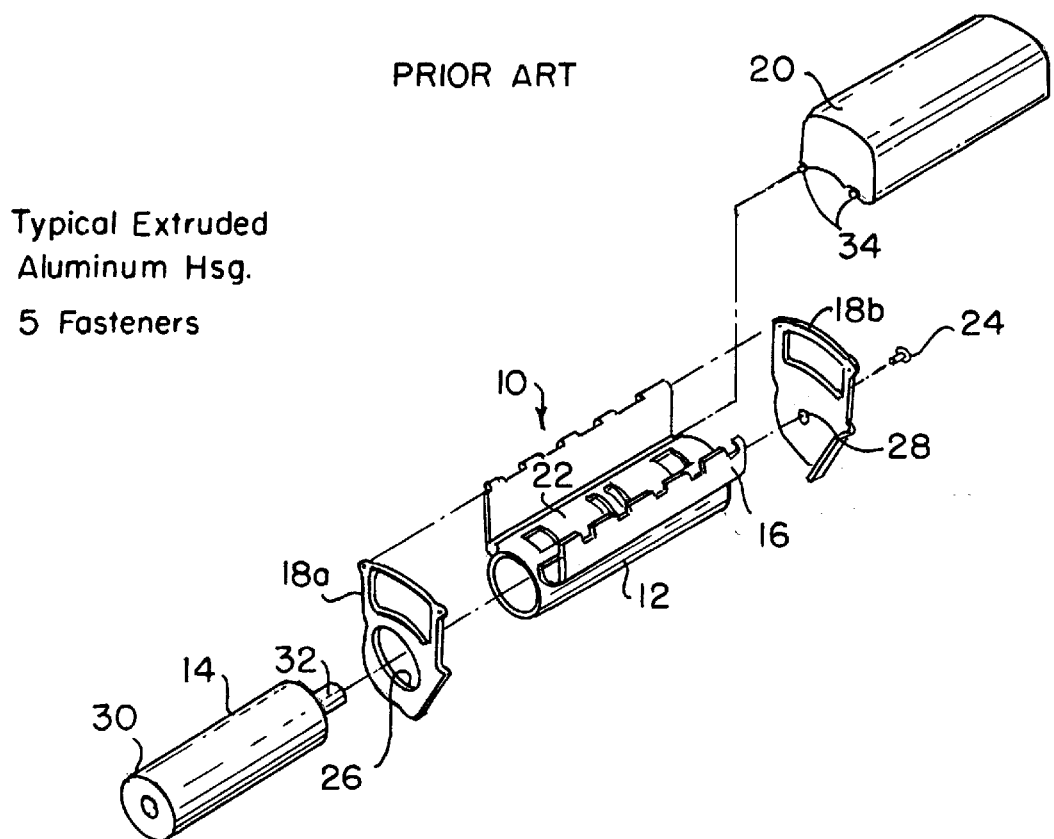
FIG. 1 is illustrative of a prior art airbag extruded aluminum module housing assembly.
Figure 2:
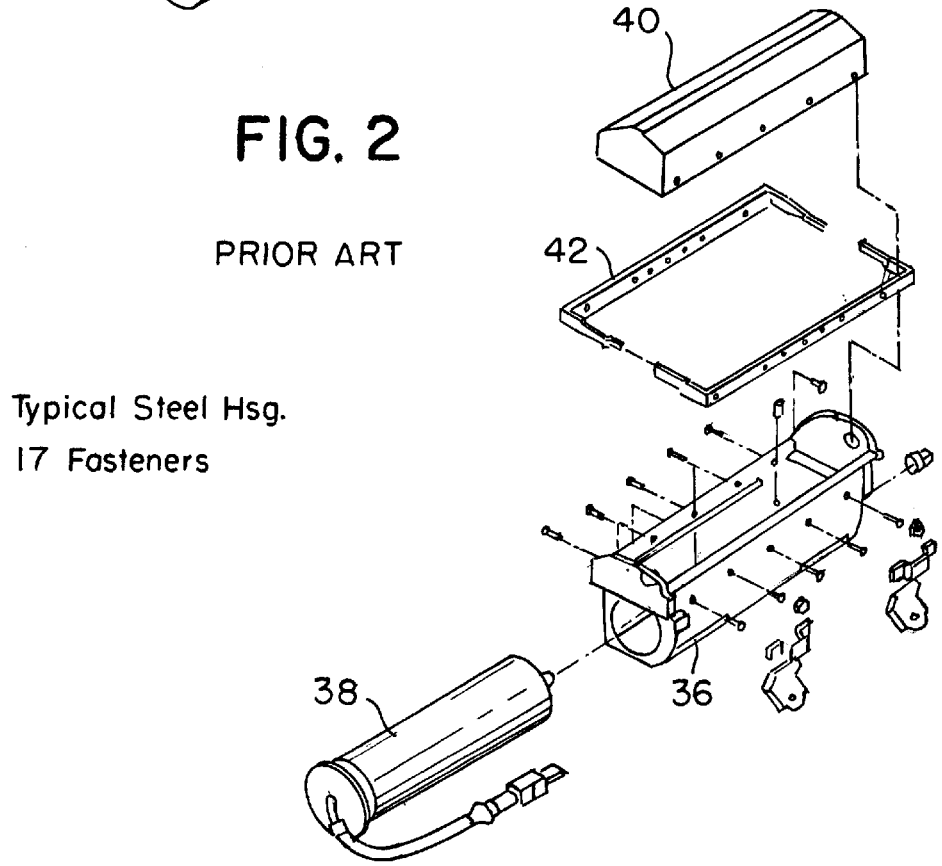
FIG. 2 is illustrative of a prior art stamped steel airbag module housing assembly.
Figure 3:
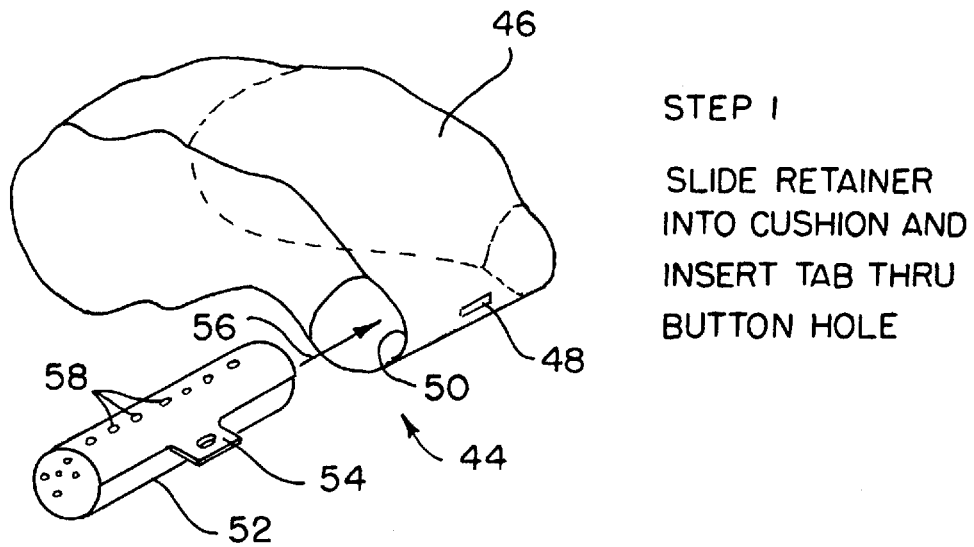
FIG. 3 illustrates an assembly view of the airbag and the retainer tube of the present invention.

There is illustrated in FIG. 3 a first step in the assembly sequence of an exemplary airbag module according to the invention. The assembly 44 includes an airbag 46 having an intermediately positioned button hole 48 formed in a cylindrical loop 50 at one end thereof, and a hollow cylindrical generally circular retainer tube 52 that is open at each end. The retainer tube 52 includes an anchor tab 54 that protrudes outwardly from the peripheral surface of the retainer tube 52 at a position that is intermediate of the length thereof. The retainer tube 52, as indicated by the arrow 56 in FIG. 3, is inserted in sliding relation into the loop 50 of the airbag 46, with the anchor tab 54 protruding outwardly through the button hole 48. The size of the loop 50 is such as to enable the retainer tube 52 to fit snugly therein.

The retainer tube 52 in the completely assembled airbag module houses an inflator and includes a plurality of apertures 58 that face inwardly of the airbag 46 to permit gas generated by the inflator to enter and inflate the airbag 46. The apertures 58 are on a side of the retainer tube 52 that is distal or remote from the anchor tab 54.

The airbag 46 is constructed to receive the retainer tube 52. The airbag construction is simplified to one main loop with the button hole 48 and two side panels. Since the airbag 46 loops around and envelops the retainer tube 52, loading is distributed and fabric stresses at airbag snap at inflation are minimized. If an internal tether were required, additional tabs could be added to anchor tab side of the retainer tube to help resist cushion rotation of the tube 52.

Figure 4:
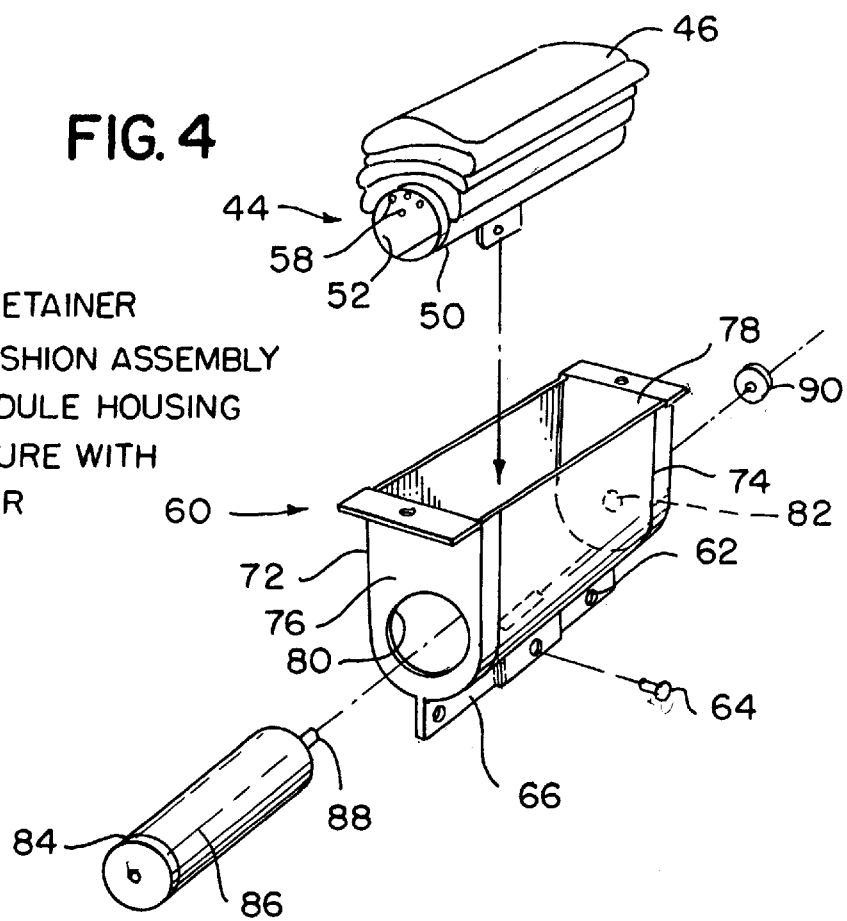
FIG. 4 illustrates an assembly view of components comprising an embodiment of the present invention.

In FIG. 4 there is shown a second step in the assembly sequence of an airbag module in accordance with the invention. The assembly 60 in FIG. 4 includes the retainer tube/airbag assembly 44 shown in FIG. 3. In FIG. 4, however, the retainer tube 52 is shown inserted in the loop 50 of the airbag 46. Additionally, the airbag 46 is folded neatly in a compacted or stored condition, proximate the side of the retainer tube 52 that contains the apertures 58.

The assembly 60 also includes a module housing 62 having an attachment flange 66 formed on the surface of the back thereof and sidewalls 72 and 74. The module housing 62 is a container into which the assembled retainer tube/airbag assembly 44 is received and positioned and secured therein by fastening by means of a first fastener 64 the anchor tab 54 to the attachment flange 66 of the module housing 62. The first fastener means 64 may comprise a nut and a bolt.

Figure 5:
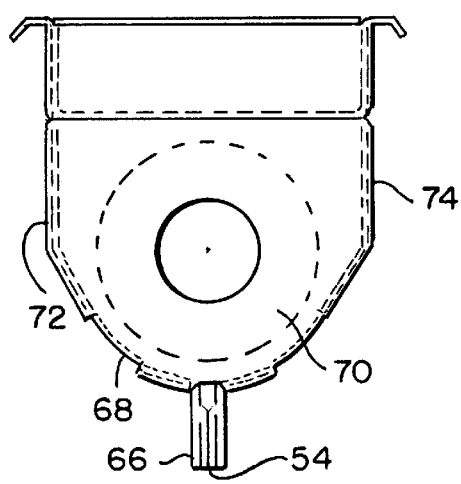
FIG. 5 is a cross-sectional view taken along the lines 5—5 of FIG. 4.

The attachment flange 66 of the module housing 62 consists of two legs 68 and 70 that extend downwardly from the back of the module housing 62, as best seen in FIG. 5, from a respectively associated sidewall 72 and 74. The legs 68 and 70 are specially framed to receive the anchor tab 54 and typically are spot welded together to maintain rigidity of the module housing 62.

The attachment flange 66 is a stiff member that will carry the heavy loading forces that are transmitted through the anchor tab 54 upon snap inflation and deployment of the airbag 46.

In addition to the sidewalls 72 and 74, the module housing 52 includes end caps 76 and 78. A circular opening 80 is provided in end cap 76 and a smaller keyed opening 82 is provided in the end cap 78. A flange 84 is provided on one end of an inflator 86 and a threaded key stud 88 is provided on the other end thereof. The size of opening 82 in the end cap 78 is such as to allow the stud 88 on one end of the inflator to be inserted therein with the flange 84 on the other end of the inflator mating with the opening 80 in the end cap 76.

A third step in the assembly sequence of the airbag module 60 in accordance with the invention is to insert the inflator 86 in the retainer tube 52 and to secure the inflator 86 therein with a fastener. This is accomplished by attaching a fastener, specifically screwing a nut 90 on the stud 88 of the inflator that protrudes through the opening 82 in the end cap 78.

Thus, the assembly of the airbag module 60 according to the invention that is illustrated in FIG. 4 requires only two fasteners, the fastener 64 for attaching the anchor tab 54 to the attachment flange 66, and the fastener 90 for securing the inflator 86 in the retainer tube 52 and the module housing 62.

The retainer tube 52 and module housing 62 typically would be constructed of mild steel or aluminum. The retainer tube 52 could also be constructed of aluminum through the extrusion process.

Figure 6:
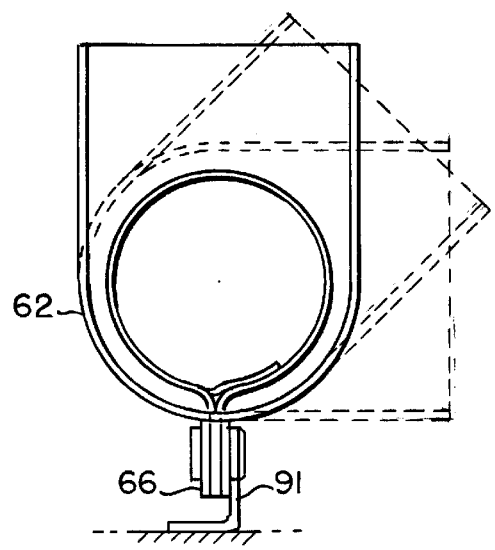
FIG. 6 is a cross-sectional view illustrating the use of the attachment flange on the module housing and the primary airbag module to vehicle attachment.

In accordance with the invention, as shown in FIG. 6, the attachment flange 66 on the module housing 62 can also function as a primary airbag module to vehicle attachment feature. That is to say, the attachment flange 66 of the module housing 62 can be directly attached, as by a suitable bracket 91, to the vehicle frame. Note, additionally, as indicated by the dotted line configuration in FIG. 6, that the attachment flange 66 can be located in any radial position within a 180 degree arc corresponding to the back half of the module housing 62.

Thus, the attachment flange 66 of the module housing 62 functions as a means for controlling the direction in which the airbag 46 expands. The attachment flange 66, as described, can be omitted under special circumstances. In such a case the anchor tab 54 would be attached parallel to the module housing sidewall 94, as illustrated in FIGS. 7 and 8.

Figure 7:
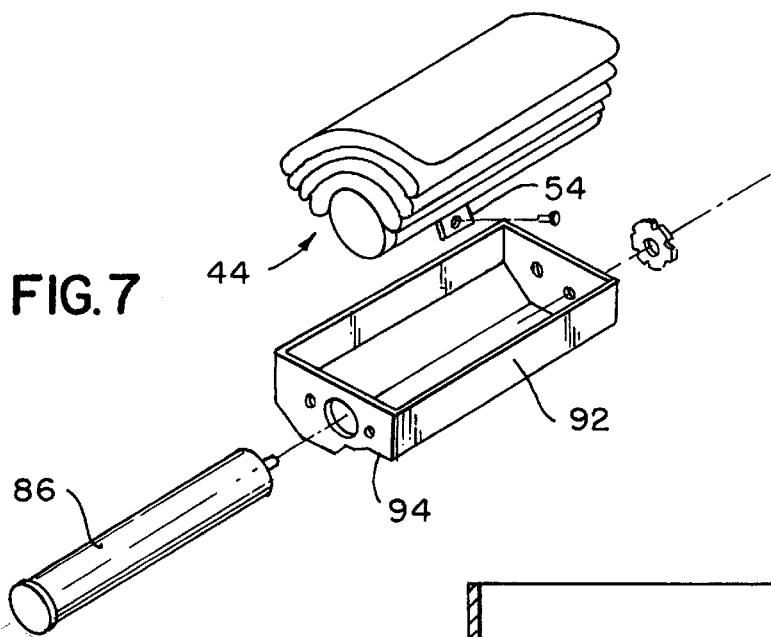
FIG. 7 illustrates an assembly view of an alternate embodiment of the invention.
Figure 8:
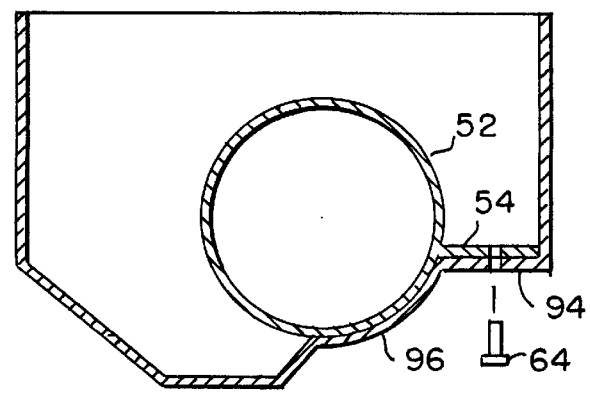
FIG. 8 is a cross-sectional view of the module housing of FIG. 7 illustrating the attachment of the retainer anchor tab internally of the module housing and parallel to the module housing side wall.

The assembly view of the alternate embodiment of the invention shown in FIG. 7 includes a retainer tube/airbag assembly 44 and an inflator 86 that may be the same as the correspondingly numbered assembly components shown in FIG. 4. In FIG. 7, however, there is shown a module housing 92 that is different from the module 62 of FIG. 4. The module housing 92 is different in two respects from the module housing 62. First, the attachment flange 66 has been omitted. Secondly, the anchor tab 54 of the retainer tube 52 is attached internally of the module housing 92 parallel to the sidewall 94 thereof. The sidewall 94, as best seen in FIG. 8, is planar and horizontally disposed. The width of the sidewall 94 is sufficient to accommodate the placement thereon of the anchor tab 54. Additionally, immediately adjacent the sidewall 94 toward the central region of the module housing 92 is a proximate section of curved sidewall 96 that matches the curvature of the retainer tube 52. The attachment by a fastener of the anchor tab 54 in parallel relation to the horizontal sidewall 94 results in supporting engagement of the curved sidewall 96 by the retainer tube 52. This provides a secure and solid attachment of the retainer tube/airbag assembly 44 within the module housing 92.

FIG. 9 is a planar view of the integral airbag/inflator barrier, that is, the retainer tube 52.

The retainer tube 52 shown in FIG. 9 comprises a substantially planar metal sheet 98 having formed therein a plurality of apertures 58 disposed on elongated path and anchor tab sections 54a and 54b. The anchor tab section 54a juts out from an edge 98a of the metal sheet 98 that is parallel to the elongated path of apertures 58. The anchor tab section 54b is located at the opposite edge 98b of the metal sheet 98. The section 54b is formed by slots 54c and 54d that are cut into the metal sheet edge 98b.

When the planar sheet is rolled about itself the anchor tab sections 54a and 54b are placed in overlapping engagement, as shown in FIGS. 10 and 11. A portion of the metal sheet edge 98b defined by the slots 54c and 54d extend inwardly of the rolled sheet, as best seen in FIG. 11.

Thus, in accordance with the invention, there has been provided a simplified airbag module housing arrangement, an arrangement that is particularly suited for stamped steel construction and that is simple, inexpensive, reliable, easy to assemble, and requires only two (2) fasteners.

In FIG. 12 there is illustrated an assembled simplified stamped steel airbag module 100 that is in general accordance with an alternative embodiment of the invention. This embodiment of the invention requires only one fastener to complete the assembly, and that is further characterized in that the total number of module parts is reduced to six, excluding a decorative cover.

Figure 14:
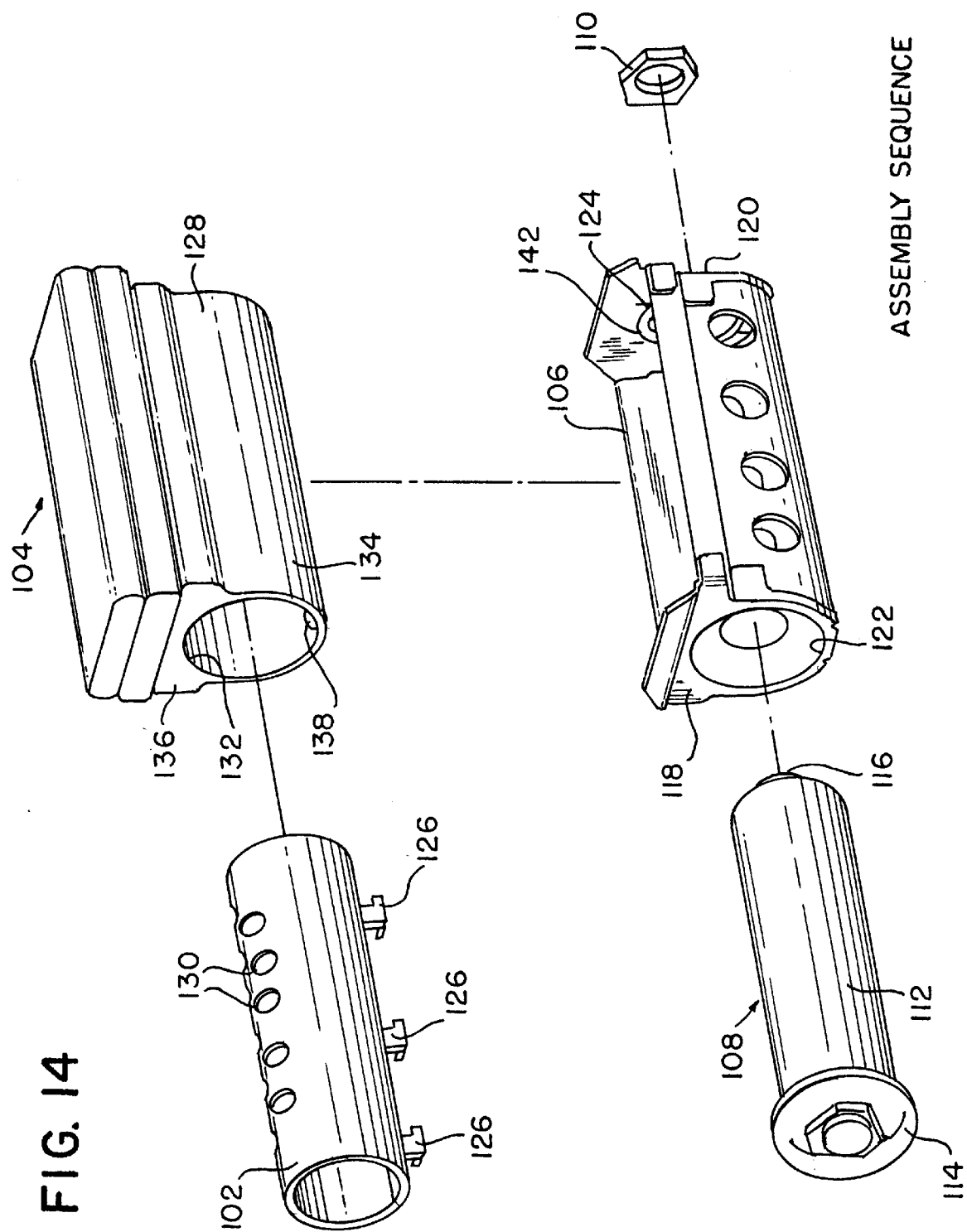
FIG. 14 is an exploded isometric view that illustrates the assembly of the components of the simplified stamped steel air bag module that is shown in FIG. 12.

The module parts, as best seen in the exploded view of FIG. 14, include a diffuser/retainer tube 102, an airbag or cushion assembly 104, a module housing 106, and a fixed abutment, specifically an inflator/adapter cup assembly 108, with a single fastener comprising a nut 110.

The inflator/adapter cup assembly 108 includes an elongated gas generator or inflator 112 and an adapter cup 114. The adapter cup 114 can be attached to the inflator 112 in any suitable manner, as for example, with screw threads, by a locking ring, or a crimping operation. The adapter cup 114 may be dispensed with if the inflator 112 already has a flange such as the flange 84, as shown in FIG. 7, and which is formed integrally with the inflators.

The fastener nut 110 is attached by screw threads to a stud 116 that is formed on the inflator 112, integrally with the end thereof that is remote from the adapter cup 114, as indicated in FIG. 14.

The module housing 106 is formed of parts that together constitute a unity and includes an endwall or plate 118 at one end and an endwall or plate 120 at the other end. When the parts of module housing 106 are in assembled relation, an aperture 122 in the endwall 118 is closed by the adapter cup assembly 108, and an aperture 124 in the endwall 120 is closed by the stud 116.

As shown in FIGS. 13 and 14, the diffuser/retainer tube 102 includes multiple T-tabs, each of which is designated by reference numeral 126. The T-tabs 126 are axially spaced apart and formed as part of the diffuser/retainer tube 102. In the assembled module 100 the multiple T-tabs 126 interlock the diffuser/retainer tube 102, the cushion assembly 104, and the module housing 106.

In the cushion assembly 104, the airbag or cushion 128 is in a compacted or stored condition, during periods prior to deployment, proximate a side of the diffuser/retainer tube 102 containing at least one aperture such as the apertures designated by reference numeral 130 in FIGS. 13 and 14. The cushion 128 includes an open end, designated 132, that is disposed about diffuser/retainer tube 102 to receive the gas for the inflation thereof that is produced by the inflator 112. Extending from the open end 132 of the cushion 128 is a loop 134 that is sized to envelop the tubular, that is, the cylindrically shaped diffuser/retainer tube 102. Included at each end of the loop 134 is a panel 136 that is formed integrally with the cushion 128 and the loop 134 and matches the curvature of the associated end of the cylindrically shaped diffuser/retainer tube 102.

Referring to FIG. 14, the module 100 is easily assembled in the following sequence. The diffuser/retainer tube 102 is simply inserted into the cushion assembly 104 and the T-tabs 126 are snapped through small spaced holes 138 in the loop 134 of the cushion 128 of the cushion assembly 104. The diffuser/retainer tube 102 is positioned into the cushion assembly 104 where the T-tabs 126 are inserted through the holes 138 in the loop 134.

The diffuser/retainer tube/cushion assembly 102/104 is then inserted into the module housing 106 where the T-tabs 126 interlock with mating axially spaced "T" slots 140 in the module housing 106, as illustrated in FIG. 13. It is noted that because of the geometry of the T-tabs 126, the cushion assembly 104 remains attached to the diffuser/retainer tube 102 during the installation into the module housing 106.

Orientation of the cushion assembly 104 to the diffuser/retainer tube 102 is controlled by offsetting one of the T-tabs 126, that is, as shown in FIG. 14, positioning the center T-tab 126 closer to the T-tab 126 that is to the left thereof than the T-tab 126 that is to the right. The holes 138 in the loop 134 and the "T" slots 140 in the module housing 106 are similarly shifted. With such shifting in the relative positions of the T-tabs 126, the holes 138 and the "T" slots 140, there is only one positional relationship of the diffuser/retainer tube 102, the loop 134 of cushion 128 and the module housing 106 at which the T-tabs 126 will interlock with the "T" slots 140.

Initially, the interlocking action occurs when the diffuser/retainer tube 102 is shifted axially about 3 mm, and permanently, when the adapter cup assembly 108 is inserted into the module housing 106 and attached by screwing the nut 110, the fastener, to the stud 116 on the other end of the inflator 112. This puts the inflator 112 in tension causing inflator/adapter cup assembly 108 to compress the diffuser/retainer 102 against the opposite endwall 120 of the module housing 106 where it is positioned by a circular rib 142.

Since the inflator 112 is attached to both endwalls 118 and 120 of the module housing 106 and the diffuser/retainer tube 102 surrounds the inflator 112, the attachment of the cushion assembly 104, and thereby the cushion 128, is very robust and reliable.

Thus, in accordance with the invention, there has been provided a unique airbag module arrangement that is particularly suited for stamped steel construction, is reliable, easy to assemble, requires only one fastener, and reduces the total number of module parts to six, excluding a decorative cover.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. In a passenger airbag module comprising
   a diffuser/retainer tube having a side that contains at least one aperture and into which diffuser/retainer tube generator means may be inserted, said generator means being of the type responsive to a control signal, for generating gas to inflate an airbag means, and
   inflatable means responsive to the gas, for protecting, when activated, an occupant of a vehicle comprising a cushion assembly, said cushion assembly having a gas inlet opening with a loop extending therefrom that is sized to envelop said diffuser/retainer tube, said cushion assembly being disposed in a compacted or stored condition prior to deployment with said gas inlet opening proximate said side of said diffuser/retainer tube that contains at least one aperture, and said loop enveloping said diffuser/retainer tube,
   the improvement comprising said diffuser/retainer tube including at least one T-tab that protrudes outwardly from a side thereon remote from said at least one aperture at a position that is intermediate the length of said diffuser/retainer tube,
   said diffuser/retainer tube being positioned into said cushion assembly where said at least one T-tab is inserted through at least one small hole that is provided in the loop of said cushion assembly,
   a module housing into which said diffuser/retainer tube/cushion assembly is insertable, said module housing having at least one "T" slot which with said at least one T-tab interlocks, which interlocking occurs initially when said diffuser/retainer tube is shifted axially with respect to said module housing.

2. A module housing, as defined in claim 1, wherein said at least one T-tab is formed as part of said diffuser/retainer tube.

3. A module housing, as defined in claim 1, wherein said diffuser/retainer tube includes multiple T-tabs.

4. A module housing, as defined in claim 3, wherein said multiple T-tabs are formed as part of said diffuser/retainer tube.

5. A module housing, as defined in claim 4, wherein said multiple T-tabs are axially spaced along the length of said diffuser/retainer tube.

6. A module housing, as defined in claim 5, wherein multiple holes provided in said loop, and multiple "T" slots provided in said module housing are axially spaced with the same spacing pattern as the spacing of said T-tabs along the length of said diffuser/retainer tube.

7. A module housing, as defined in claim 6, wherein orientation of said cushion assembly to said diffuser/retainer tube is controlled by offsetting one of said T-tabs.

8. A module housing, as defined in claim 1, wherein said cushion assembly in addition to said loop and said at least one small hole therein includes at each end of said loop a panel that is formed integrally therewith that matches the curvature of the associated end of said diffuser/retainer tube.

9. A module housing, as defined in claim 1, wherein said diffuser/retainer tube and said module housing are made of stamped steel.

10. A module housing, as defined in claim 1, wherein said gas generator means includes an elongated inflator having a threaded stud at a first end and a fixed abutment at a second end, and wherein said module housing includes first and second endwalls which are opposed and each of which have an aperture, wherein, when the parts of said module housing are in assembled relation, said aperture of said first endwall is closed by said inflator threaded stud and the aperture of said second endwall is closed by said abutment, and wherein the parts of said module housing are maintained in assembled relation by a single fastener comprising a nut screwed on the portion of said inflator stud that extends through said first endwall of said module housing with the spacing between said endwalls being such relative to the length of said inflator that this causes said abutment to compress said diffuser/retainer tube against said first endwall and to place said inflator under tension.

11. A module housing, as defined in claim 10, wherein said fixed abutment at the second end of said inflator comprises an adapter cup that is fixedly attached thereto.

12. A module housing, as defined in claim 11, wherein said adapter cup is attached to the second end of said inflator in any suitable manner such as by screw threads, a locking ring, or a crimping operation.

13. A module housing, as defined in claim 10, wherein said fixed abutment at the second end of said inflator is an integrally formed flange.

* * * * *